United States Patent
Mehdizadeh

(10) Patent No.: US 9,642,476 B1
(45) Date of Patent: May 9, 2017

(54) APPARATUS FOR AND METHOD OF SECURING, DISPLAYING AND DISPENSING HERBAL PRODUCTS INCLUDING MONITORING QUANTITY AND CATEGORY OF HERBAL PRODUCTS DISPENSED, AND THE PERSONS WHO RESPECTIVELY DISPENSED AND RECEIVED EACH RESPECTIVE PRODUCT

(71) Applicant: P. Vincent Mehdizadeh, West Hills, CA (US)

(72) Inventor: P. Vincent Mehdizadeh, West Hills, CA (US)

(73) Assignee: Pineapple Express, Inc., Los Angeles, CA (US)

( * ) Notice: Subject to any disclaimer, the term of this patent is extended or adjusted under 35 U.S.C. 154(b) by 0 days.

(21) Appl. No.: 15/013,981

(22) Filed: Feb. 2, 2016

Related U.S. Application Data

(60) Provisional application No. 62/203,845, filed on Aug. 11, 2015.

(51) Int. Cl.
| | |
|---|---|
| A47F 3/02 | (2006.01) |
| A47F 7/00 | (2006.01) |
| B65D 25/54 | (2006.01) |
| A47F 10/02 | (2006.01) |
| A47F 3/00 | (2006.01) |
| E05B 65/46 | (2017.01) |
| E05B 65/462 | (2017.01) |
| E05B 65/00 | (2006.01) |

(Continued)

(52) U.S. Cl.
CPC ............ *A47F 7/0078* (2013.01); *A47F 3/007* (2013.01); *A47F 3/02* (2013.01); *A47F 10/02* (2013.01); *B65D 25/54* (2013.01); *E05B 65/0075* (2013.01); *E05B 65/461* (2013.01); *E05B 65/462* (2013.01); *G01G 19/40* (2013.01); *G01G 19/52* (2013.01); *G06F 17/30864* (2013.01); *G07C 9/00134* (2013.01); *G07F 11/62* (2013.01); *A47F 2010/025* (2013.01)

(58) Field of Classification Search
CPC .. A47F 3/02; A47F 3/0434; A47F 1/04; A47F 10/02; G07F 11/62
USPC ........................................ 221/155; 700/236
See application file for complete search history.

(56) References Cited

U.S. PATENT DOCUMENTS

| | | | | |
|---|---|---|---|---|
| 1,401,825 | A | * | 12/1921 | Squire ..................... A47F 3/001 312/120 |
| 3,602,562 | A | * | 8/1971 | Radelfinger ............ A47F 7/024 116/99 |

(Continued)

*Primary Examiner* — Timothy Waggoner
(74) *Attorney, Agent, or Firm* — Thomas I. Rozsa

(57) ABSTRACT

An apparatus at a dispensary where herbal products are sold to a consumer who has authorization to use the herbal products. The present invention fulfills in an innovative way four requirements for such a dispensary: (a) a safe to store all herbal products in a secure manner; (b) a user friendly display where different variations and quantities of herbal products are securely displayed with advisory information on each displayed product; (c) a series of electronic scales inside locked compartments to accurately weigh the amount of herbal products contained in the apparatus; and (d) an accurate inventory control system connected to a computer that uses data points received from the scales housed in the interior of the apparatus and gives real-time inventory measurements.

14 Claims, 9 Drawing Sheets

(51) Int. Cl.
*G07C 9/00* (2006.01)
*G06F 17/30* (2006.01)
*G01G 19/40* (2006.01)
*G01G 19/52* (2006.01)
*G07F 11/62* (2006.01)

(56) References Cited

U.S. PATENT DOCUMENTS

| | | | | |
|---|---|---|---|---|
| 4,925,038 | A | * | 5/1990 | Gajewski .............. A47F 5/0018 211/128.1 |
| 5,902,984 | A | * | 5/1999 | Planke ...................... G07F 7/00 186/56 |
| 6,102,162 | A | * | 8/2000 | Teicher .................. G07F 9/105 186/39 |
| 7,844,363 | B1 | * | 11/2010 | Mehdizadeh ....... G06F 19/3462 700/232 |
| 8,175,746 | B2 | * | 5/2012 | Godlewski ............ A61J 7/0069 700/236 |
| 8,392,019 | B2 | * | 3/2013 | Segal ...................... G07F 11/00 221/126 |
| 8,818,820 | B1 | | 8/2014 | Mehdizadeh |
| 2008/0269947 | A1 | * | 10/2008 | Beane .................... G06Q 20/12 700/237 |

* cited by examiner

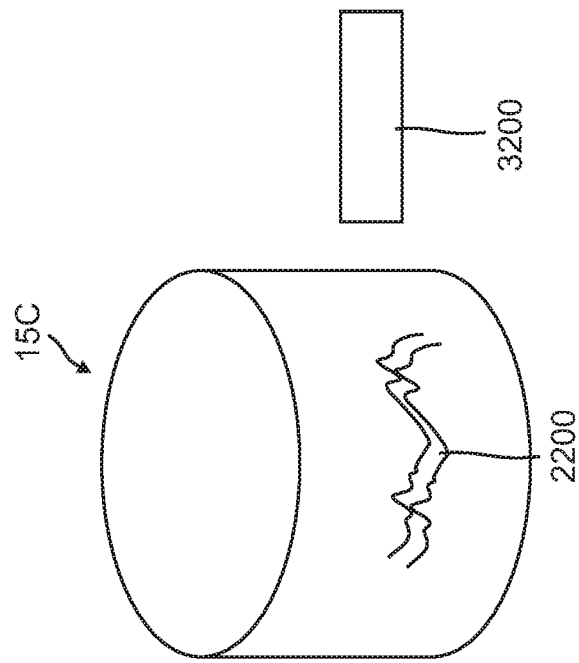
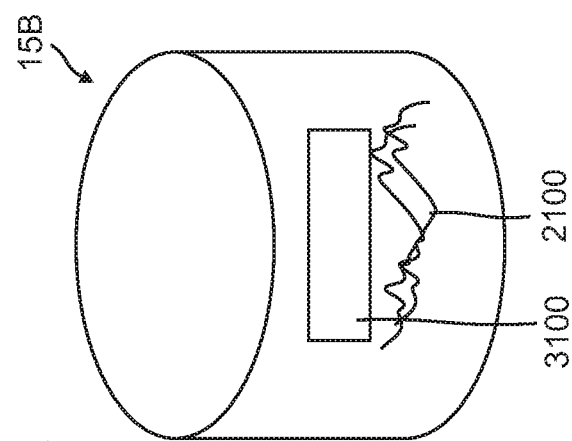
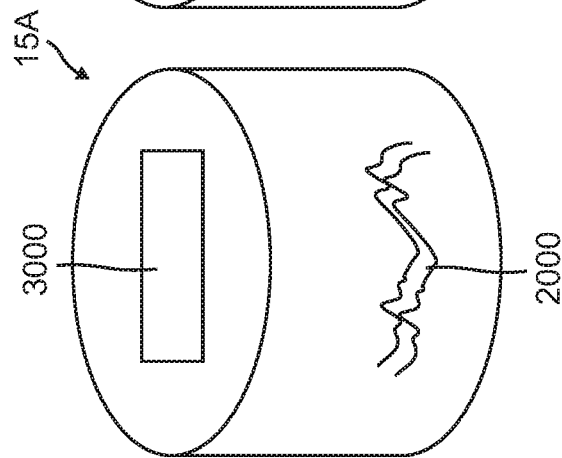
FIG. 1C
FIG. 1B
FIG. 1A

APPARATUS FOR AND METHOD OF SECURING, DISPLAYING AND DISPENSING HERBAL PRODUCTS INCLUDING MONITORING QUANTITY AND CATEGORY OF HERBAL PRODUCTS DISPENSED, AND THE PERSONS WHO RESPECTIVELY DISPENSED AND RECEIVED EACH RESPECTIVE PRODUCT

CROSS-REFERENCE TO RELATED APPLICATION

This patent application claims priority to Provisional Application No. 62/203,845 filed on Aug. 11, 2015.

BACKGROUND OF THE INVENTION

1. Field of the Invention

The present invention relates to the field of apparatus and facilities for and method of displaying, securing and dispensing herbal products including monitoring the dispensing of the product.

2. Description of the Prior Art

The present inventor is an innovator in the field of the present invention and is named as the inventor of the invention protected through the following issued United States patents:

1. U.S. Pat. No. 7,844,363 issued on Nov. 30, 2010 to P. Vincent Mehdizadeh for "VENDING MACHINE APPARATUS TO DISPENSE HERBAL MEDICATIONS AND PRESCRIPTION MEDICINES", 2. U.S. Pat. No. 8,818,820 issued on Aug. 26, 2014 for P. Vincent Mehdizadeh for "SYSTEM TO VERIFY IDENTITY OF PATIENT RECEIVING MEDICATION AND MONITORING THE DISPENSING OF MEDICATION TO THE PATIENT INCLUDING MONITORING THE DEVELOPMENT OF THE MEDICATION FROM WHERE THE SEEDS ARE OBTAINED, HOW THE PLANT WAS CULTIVATED, WHERE THE MEDICAL PORTION OF THE PLANT WAS HARVESTED AND CONVERTED INTO THE MEDICATION TO BE DISPENSED TO A PATIENT".

The present inventor is not aware of any other patents or publications which disclose the present invention.

SUMMARY OF THE INVENTION

The present invention includes a user friendly apparatus to retain and safely store herbal products at a dispensary where such herbal products are sold to a consumer who has authorization to purchase and use the herbal products. The present invention fulfills in an innovative way, four requirements for such a dispensary:

(a) a safe to store all herbal products in a secure manner;

(b) a user friendly display where different variations and quantities of herbal products are securely displayed with advisory information on each displayed product;

(c) a series of electronic scales inside locked compartments to accurately weigh the amount of herbal products contained in a respective container set above a respective scale in a respective compartment in the apparatus, with a quantity of a respective herbal product retained in each respective container; and (d) an accurate inventory control system through a computer connected to the apparatus's internal computer that uses data points received from the scales housed in the interior of the apparatus and gives real-time inventory measurements as product is added and subtracted from the system and provides access to the various locked compartments allowing for dispensing of the products to occur in a controlled environment.

It is an object of the present invention to provide a dispensary for herbal products as described above.

It is a further object of the present invention to provide a secure display with at least a transparent top and front where containers such as jars set in a multiplicity of organized settings such as checkerboard, vertical and horizontal rows, or random settings, with information on the contents of each jar having a label describing the herbal product variation and a legible information sheet within a reasonable proximity of the jar such as in front of, above, below or adjacent a side of the jar. The rows and columns of the invention are not limited to a minimum or a maximum but will most likely be either 3 by 6, 4 by 6, 3 by 7, or 4 by 7, listed as row by column respectively. These display jars will correspond to the physical inventory housed in the interior of the apparatus and out of plain site.

It is also an object if the present invention have the display serving as a counter with the display resting on or affixed to the safe and locked compartments within the safe containing the products for-sale by the dispensary.

It is an additional object of the present invention to have a UL safe rating and have a built-in fingerprint scanner and numeric key panel on the cabinet to verify that only pre-approved store personnel that have been authenticated through both the built-in fingerprint scanner and numeric key panel and through biometric identification and numeric pin code have the ability to access the interior of the safe and unlock compartments within the safe. Affixed to one side such as to the left of the cabinet on a pedestal is a point-of-sale system that will have a registration box with a card swiper and fingerprint reader to verify the operator of the herbal dispenser. Both are separately or jointly connected through a USB cable to a computer.

It is a further object of the present invention to have a method or system of inventory control where the amount of a certain herbal product is confirmed and that the customer was authorized to make the legal purchase and to confirm the person making the sale was authorized to gain access to the herbal substance and process the sale. The system monitors all inventory to be certain the sales person is correctly accounting for inventory sold, the consumer has purchased a legally permissible amount in accordance with state law, and to confirm that the remaining inventory is correctly reported. The local computer will have a record of all sales and quantities sold. It is also within the spirit and scope of this invention for this computer to communicate with a municipality such as a city or state central database for global record keeping purposes.

Therefore, it is an object of the present invention to control the dispensing of herbal products and to have a complete accounting of who gained access to sell the herbal product, when the herbal product was obtained and to which employee of a dispensary the product was dispensed to prevent inventory theft.

An embodiment of the present invention can be described as an apparatus to maintain and sell an inventory of herbal products, the apparatus comprising: (a) a display safe including a display case portion and a storage safe portion; (b) said display case portion having a transparent top, a transparent front wall, a transparent first sidewall, a transparent second sidewall, a transparent rear wall, and a bottom wall all enclosing an interior compartment, at least one of said transparent top, transparent front wall, transparent first sidewall, transparent second sidewall, and transparent rear wall including an opening member by which it is moved to an opened condition to gain access to said interior compartment and moved back to its non-opened condition and having a locking member; (c) a multiplicity of at least partially transparent display containers removably retained within said interior compartment of said display case, a respective one of each of said multiplicity of at least partially transparent display containers having at least an exterior transparent wall and a bottom wall enclosing an interior compartment removably retaining a specific specimen of an herbal supplement, a member having information on said specific herbal supplement; (d) a secure safe portion positioned within a frame having at least a front wall, a first sidewall, a second sidewall, a body and a rear wall with a rear wall locking member, a multiplicity of lockboxes within said body, a respective one of each of said multiplicity of lockboxes having an interior compartment surrounded by exterior walls including a bottom wall, an electronic weigh scale positioned within the interior compartment and a removable container retaining a for-sale quantity of an herbal supplement corresponding to a respective specific specimen herbal supplement in a respective display container in said interior compartment of said display case, each of said multiplicity of lockboxes having an access door with an access door electronic lock, a computer at a location within said body of said secure safe portion and in communication with each respective weigh scale in each respective lockbox receiving information on the weight of each respective for-sale herbal supplement in each respective removable container in each respective lockbox; and (e) an access to each respective lockbox verification member, a for-sale quantity of herbal supplement measurement member, an herbal supplement purchaser verification member and a central database communication member.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated:

FIG. 1A is a perspective view of a display container with a first example of a specimen herbal product retained therein with an information label about the specimen herbal product therein on the top of the display container;

FIG. 1B is a perspective view of a display container with a second example of a specimen herbal product retained therein with an information label about the specimen herbal product therein on at least a portion of the sidewall of the display container;

FIG. 1C is a perspective view of a display container with a third example of a specimen herbal product retained therein with an information label about the specimen herbal product therein adjacent the display container;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
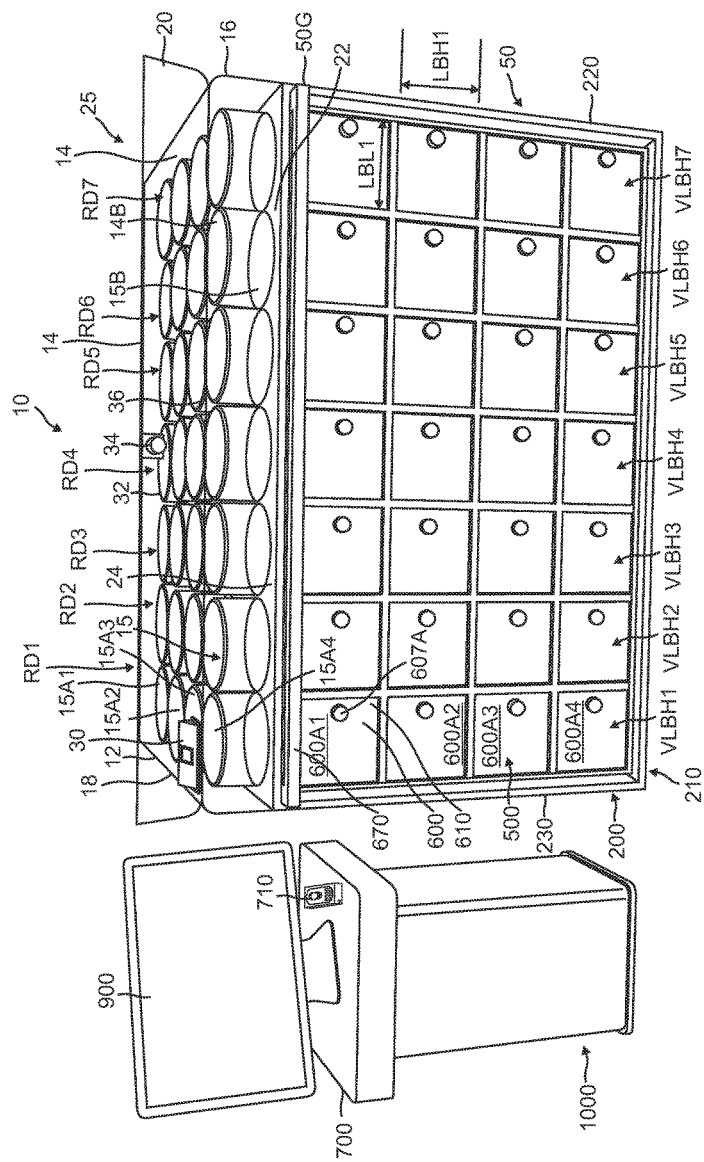
FIG. 1 is a rear perspective view of a first embodiment of the present invention display safe with the closing cover of the safe moved to an opening between the safe containing separate lockboxes retaining separately stored variations of an herbal substance within each respective lockbox and the display counter, the display counter moved to an opened condition to enable an authorized sales person to gain access to display containers within the display counter and corresponding herbal substance for-sale within a respective lockbox, and a stand with a computer and monitor to one side of the safe and display counter.

Referring to FIG. 1, there is illustrated is a rear perspective view of a first embodiment of the present invention (used to illustrate features of the present invention which are incorporated in other embodiments of the present invention) secure safe 10 with two major safe components which are a display case portion 25 on top, also referred to as a top display case, and a storage safe portion 50. Top display case 25 is preferably transparent with a transparent top wall 12, a transparent front wall 14, a transparent first sidewall 16, a transparent second sidewall 18, and a transparent rear wall 20, which in this embodiment also serves as an access door to the transparent display case 25, and a bottom wall 22 which can be a separate wall or an upper surface of an exterior safe frame as will be described, all surrounding an interior compartment 24. A first embodiment, as illustrated in FIG. 1, has a total of 28 display containers located within top display 25.

The display case 25 includes a multiplicity of display containers having a specimen herbal product. The display containers are removably retained within the interior compartment 24 of transparent display case 25. Variations of embodiments illustrative of the display containers and information about specimen herbal products retained therein are illustrated in FIGS. 1A through 1C. Referring to FIG. 1A, the display container 15A has a first example of a specimen herbal product 2000 retained therein with an information label 3000 about the specimen herbal product 2000 on the top of the display container 15A. Referring to FIG. 1B, the display container 15B has a second example of a specimen herbal product 2100 retained therein with an information label 3100 about the specimen herbal product 2100 on at least a portion of the sidewall of the display container 15BA. Referring to FIG. 1C, the display container 15C has a third example of a specimen herbal product 2200 retained therein with an information label 3100 about the specimen herbal product 2200 located adjacent to the display container 15C (usually on the bottom wall 22 of the display case 25A.

Figure 2:
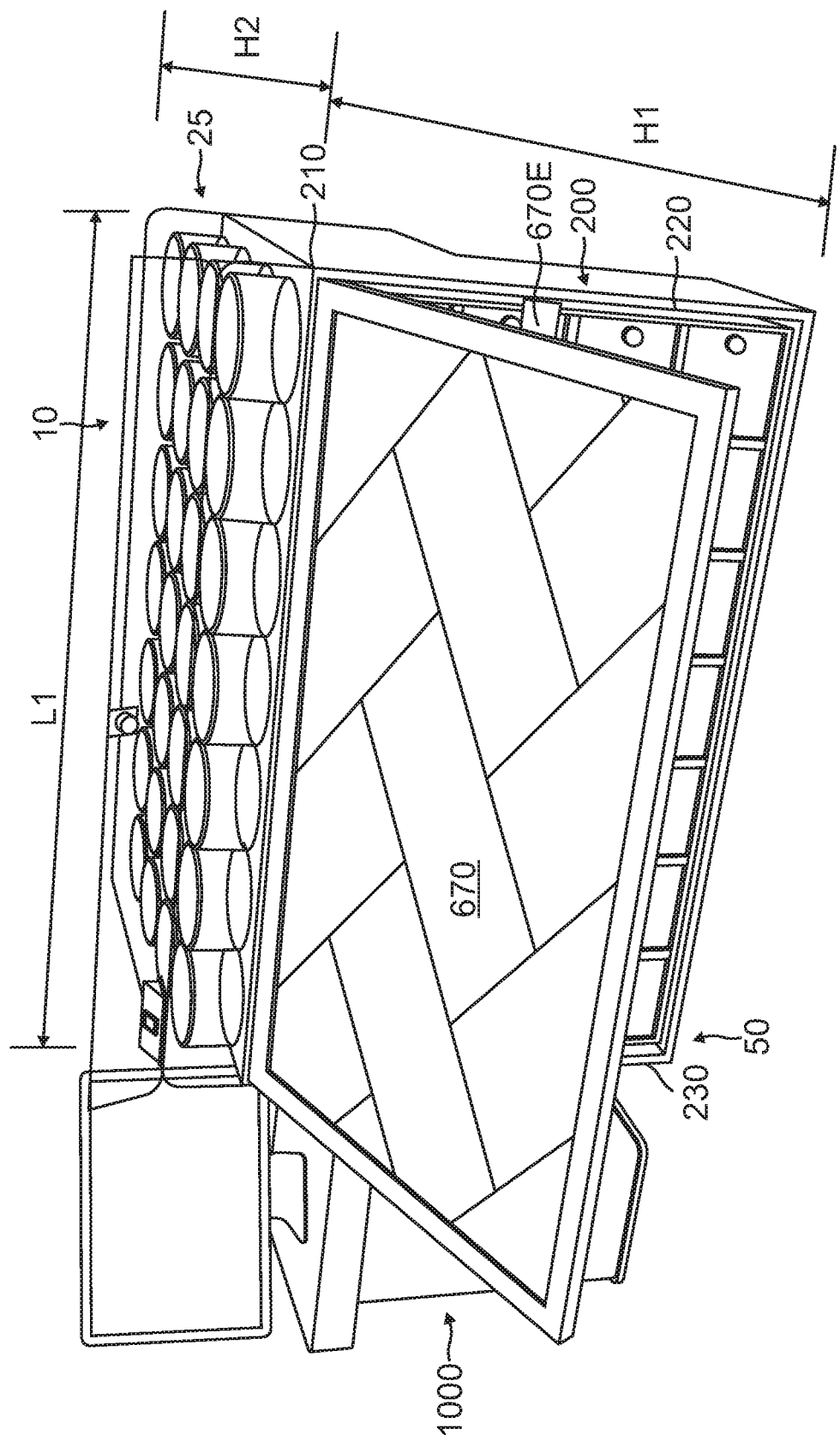
FIG. 2 is a rear perspective view of the first embodiment of the present invention illustrated in FIG. 1, illustrating the closing cover of the safe moved to a location adjacent to where closing cover it will be in a position to have a lock in the closing cover engaged to prevent access to the lockboxes.
Figure 3:
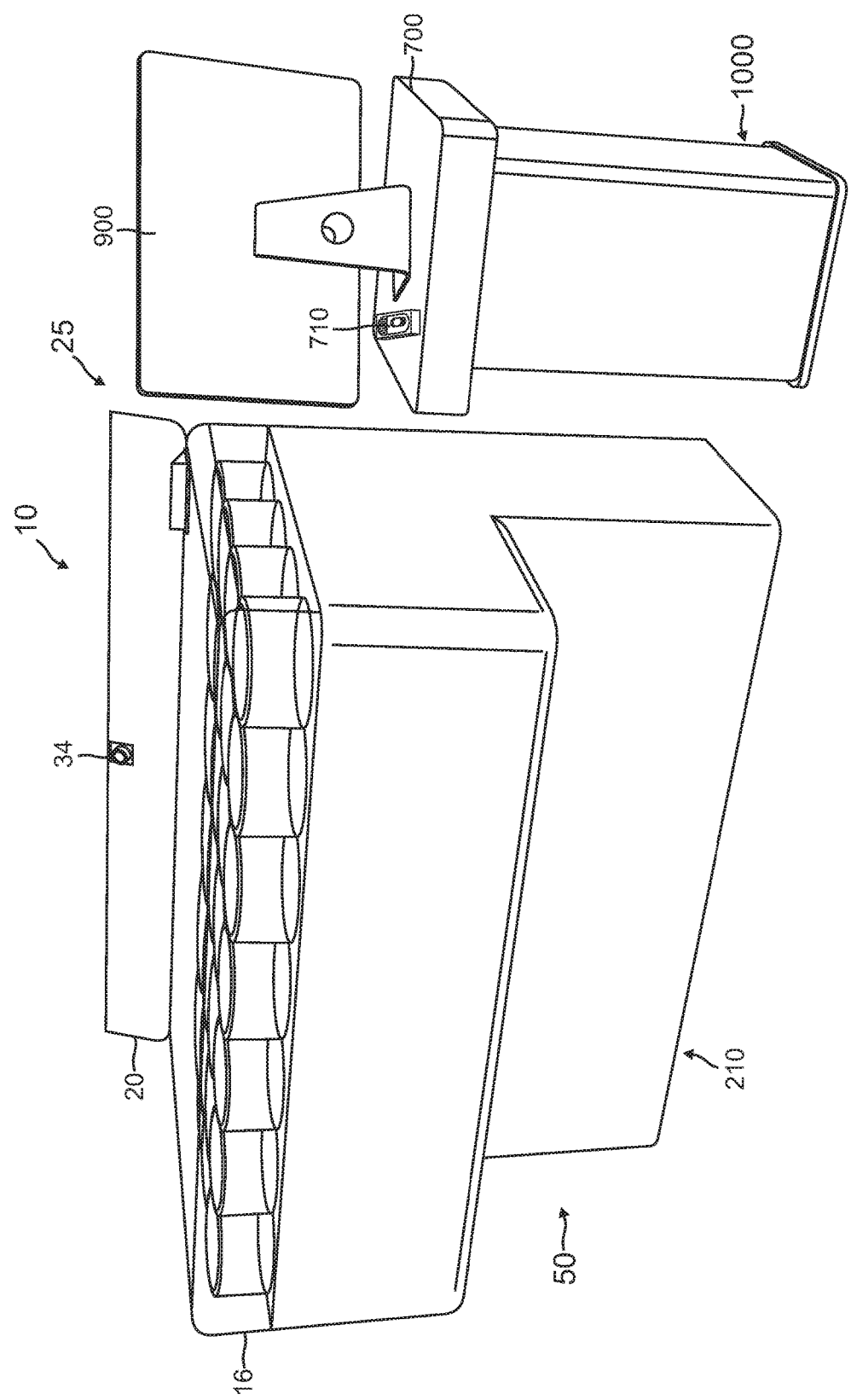
FIG. 3 is a front perspective view of the safe, display counter, stand, computer and monitor of the first embodiment of the present invention illustrated in FIG. 1 and FIG. 2.
Figure 4:
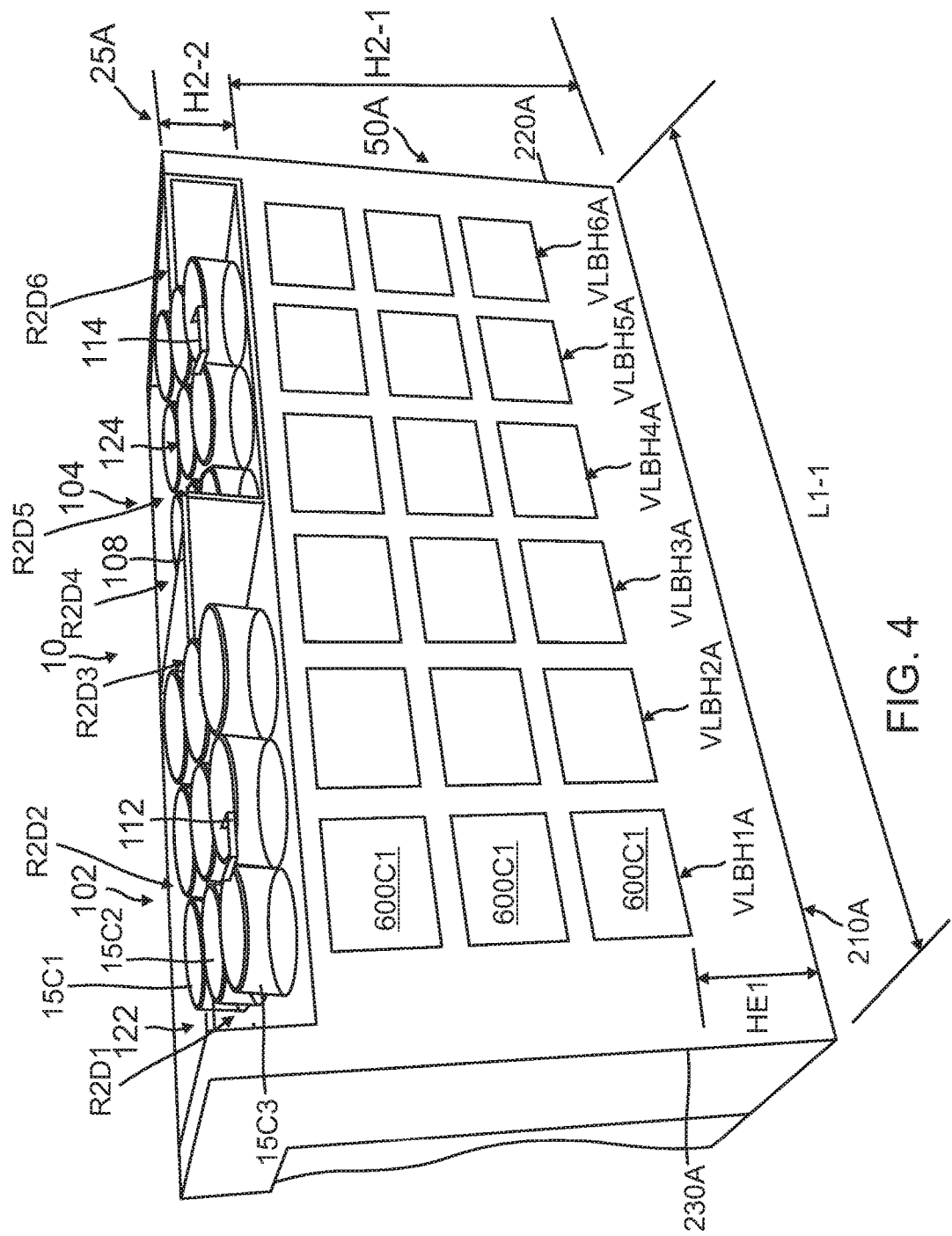
FIG. 4 is a rear perspective view of an alternative second embodiment of the safe and display counter of the present invention.
Figure 5:
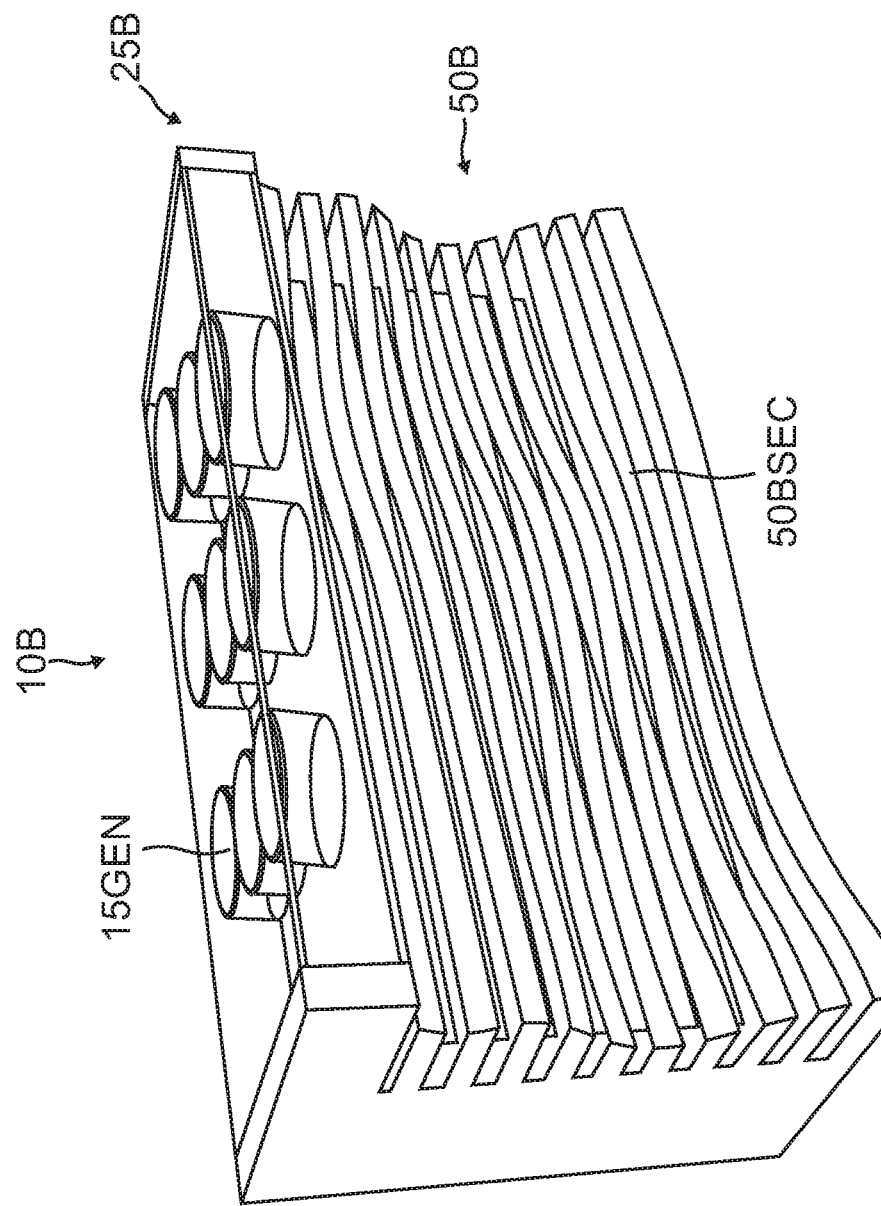
FIG. 5 is a front perspective view of an alternative third embodiment of the display case of the present invention.

In the illustrations in each of FIGS. 1-3, in display case 25 there are four (4) separate display containers in each transverse row, with seven (7) transverse rows, which is a total of twenty-eight (28) display containers. Referring to FIG. 4, in display case 25A, there are three (3) separate display containers in each of six (6) display case transverse rows (which are illustrated at an angle but also can be in straight lines as illustrated in FIG. 1), for a total of eighteen (18) display containers in the FIG. 4 embodiment. In FIG. 5, in display case 25B, there are randomly distributed display containers in the display case 25B, which have five (5) display containers. It is within the spirit and scope of the present invention for there to be any selected multiplicity of display containers in any combination of containers in a transverse row and in any number of rows, including a random distribution of display containers.

In a preferred embodiment, a respective transverse row of display cases is aligned with a corresponding vertical row of lockboxes 600 in the storage safe portion 50 so that a specimen herbal product retained in a display container in the display case corresponds to a for-sale supply of the same herbal product in a container in an aligned vertical row of lockboxes.

For example, referring to FIG. 1, display container 15A1 has a specimen herbal product corresponding to the for-sale supply of the same herbal product in a container in lockbox 600A1; display container 15A2 has a specimen herbal product corresponding to the supply of the same for-sale herbal product in a container in lockbox 600A2; display container 15A3 has a specimen herbal product corresponding to the supply of the for-sale same herbal product in a container in lockbox 600A3; and display container 15A4 has a specimen herbal product corresponding to the supply of the same for-sale herbal product in a container in lockbox 600A4. Referring to FIG. 4, display container 15C1 has a specimen herbal product corresponding to the supply of the same for-sale herbal product in a container in lockbox 600C1; display container 15C2 has a specimen herbal product corresponding to the supply of the same for-sale herbal product in a container in lockbox 600C2; and display container 15C3 has a specimen herbal product corresponding to the supply of the same for-sale herbal product in a container in lockbox 600C3. It will be appreciated that any number of display containers with a specimen herbal product in a transverse row in a display case and corresponding number of lockboxes in a vertical row with a for-sale supply of the sample specimen for-sale herbal product are within the spirit and scope of the present invention. Any corresponding number of specimen containers and corresponding rows of lockboxes are within the spirit and scope of the present invention. The specimen herbal product in a display container needs to be the same as the for-sale supply of the same herbal product in a container in a corresponding lockbox and the same herbal product can be within more than one display container and corresponding lockbox.

It is within the spirit and scope of the present invention to have a multiplicity of organized display containers such as checkerboard, vertical and horizontal rows, or random locations in the display case, with information on the contents of each display container having a label describing the herbal variation and a legible information sheet within a reasonable proximity of the display container such as in front of, above, below or adjacent a side of the container.

Referring to FIG. 5, there is illustrated another variation of the secure safe 10B with display case 25B and safe portion 50B with a protective shield 50BSEC to provide additional security to the front of the safe portion 50B.

As further illustrated in FIG. 1, top wall 12 has a fingerprint recognition panel 30 which, by way of example, is located in the left rear portion of top wall 12. The transparent display case 25 also has a transparent rear wall 20 which functions as a door which allows access to the display containers. Transparent door 20 is hingeably affixed to top wall 12 by at least one hinge 36 to enable the top wall to be rotated to an open condition to gain access to the interior 24. The top wall 12 optionally has at least one locking member 34.

It is also within the spirit and scope of the present invention for the display case 25A to have two separate sections which have slidable sections. Referring to FIG. 4, slidable section 102 has a handle 112 and slidable section 104 has a handle 124 to enable each section to be pulled out by conventional members such as a rolling rail on both or at least one of a transverse side of a slidable section. Also, the display case can have other opening doors and locks in addition to the door and locking member illustrated in FIGS. 1 through 3.

Referring again to FIG. 1 and to FIG. 2, the second component of the safe portion 10 is the storage safe portion 50. The storage safe portion 50 includes a multiplicity of lockboxes generally numbered 600 with subgroups of lockboxes having sub-letters to define a specific lockbox. In preferred embodiments, the lockboxes are arranged in vertical rows and horizontal rows, FIG. 1 illustrates an embodiment having four (4) lockboxes aligned in vertical rows. In FIG. 1, there are seven (7) vertical rows of lockboxes numbered VLBH1, VLBH2, VLBH3, VLBH4, VLBH5, VLBH6 and VHBLH7. The storage safe portion 50 is enclosed in a frame 200 with a top wall 22 (also the bottom wall of the display case), a bottom wall 210, a first sidewall 220 and a second sidewall 230. The lockboxes are enclosed within the frame 200. In the embodiment illustrated in FIGS. 1 and 2, the lockboxes extend from adjacent the top wall 22 to adjacent the bottom wall 210. By way of example, if the safe portion has a height H1, each lockbox is seven and one-half (7½) feet high and if the length L1 of safe portion 50 is seven (7) feet long, each lockbox has a width LBL1 of one (1) foot. A gap 50G is between a bottom surface of top wall 22 and the uppermost lockboxes to facilitate retention of lockbox safe cover 670 which includes at least one electronic lock 670E (See FIG. 2), which by way of example, slides into or behind sidewall 220 in the locked condition and slides behind lockbox safe cover 670 in the unlocked condition. When locked, the lockbox safe cover 670 covers all of the lockboxes. When opened, the cover is retracted into the gap 50G. While shown solid, it is also within the spirit and scope of the present invention to be corrugated and fold up.

In an alternative embodiment illustrated in FIG. 4, the vertical dimension of the secure safe 10 is six (6) inches (H2-2) for the display case and thirty (30) inches for the height (H1-1) for the secure safe portion. The length L1-1 is six (6) feet. In this embodiment, the lockboxes only extend for three (3) lockboxes in each vertical lockbox row VHBH1A, VHBH2A, VHBH3A, VHBH4A, VHBH5A and VHBH6A. The rows do not extend to bottom wall 210A, leaving a space HE1 for wires, cables, etc. For this embodiment of the present invention storage safe portion 50A, with each lockbox having a dimension of seven and one-half (7½) inches by seven and one-half (7½) inches, there is extra wall thickness between each lockbox providing more room for each lock on each separate lockbox. Therefore, the present invention provides a double security system, each separate lockbox has a separate electronic lock and the lockbox cover 670 has a separate electronic lock. Each dispensary employee will have to be pre-registered and have identification requirements as hereafter discussed in to order to have both electronic lock systems opened in order for the employee to gain access to each respective lockbox.

It is within the spirit and scope of the present invention for the secure safe portion 50 to house any desired multiplicity of individual lockboxes have a closing door with or without a handle and an electronic lock to lock and unlock each individual lockbox. Each individual lockbox has an interior compartment which retains a weight scale and a container with a selected variation of herbal supplement retained within the container. The respective weigh scales are hard wire connected to a computer within the secure safe portion, which computer wirelessly transmits data to an external computer (to be described). Each respective weigh scale may have a visual weight readout. The quantity by weight of a for-sale herbal product within a respective container is known (deducting the weight of the container), and when the container is removed to remove and weigh out a quantity of for-sale herbal product and then the container is replaced into its respective compartment, the difference in weight is calculated by the within secure safe portion computer and there the amount of for-sale herbal product removed and sold is calculated and this information is transmitted directly or indirectly to a central computer database.

Figure 6:
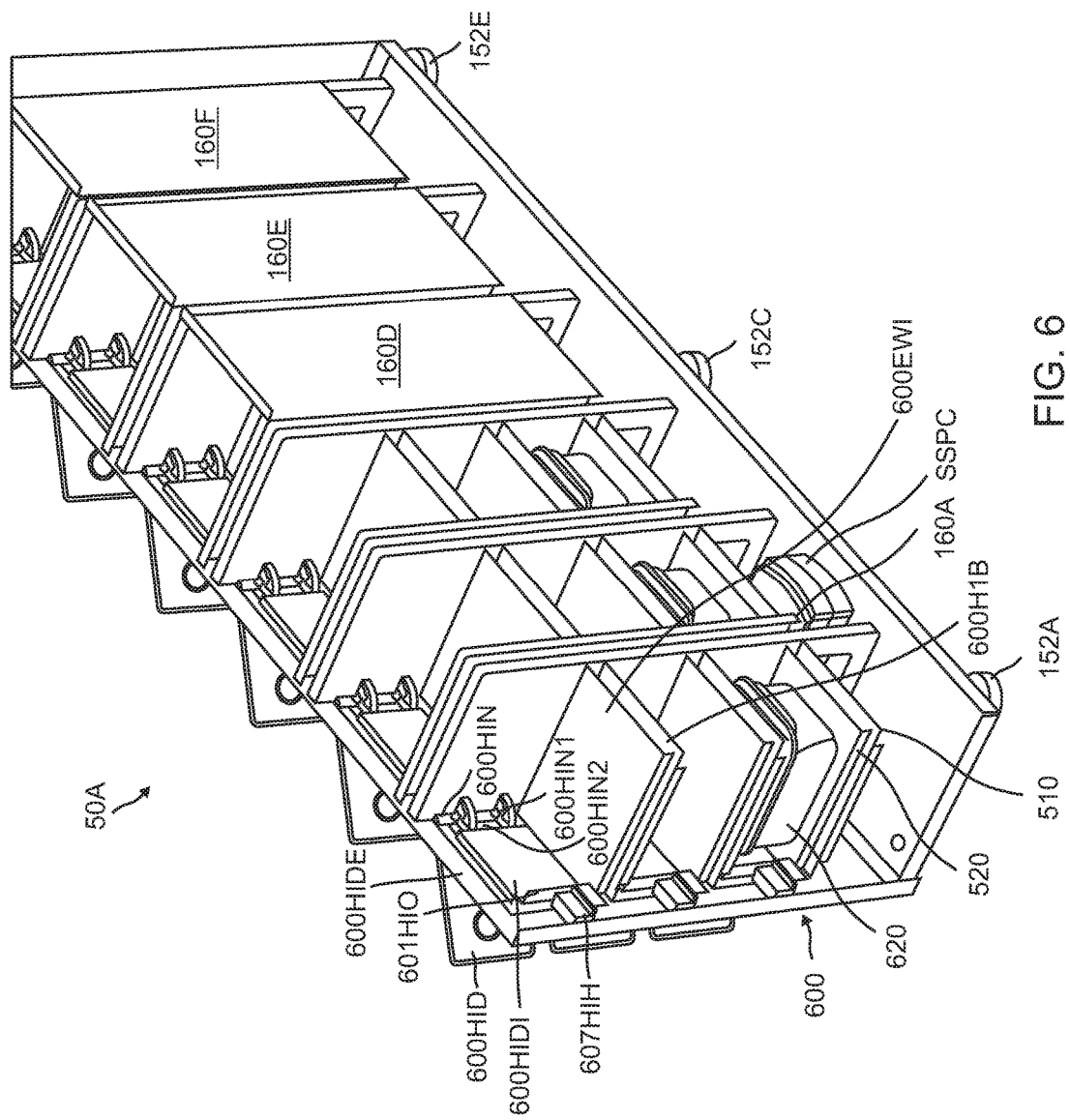
FIG. 6 is a top rear perspective view of an operative portion of a part of a safe of an embodiment of the present invention illustrating all of the respective doors to each safe lockbox in an opened condition and some of the panels within a and adjacent to a front wall of the safe removed for illustrative purposes to illustrated a respective weigh scale in a respective lockbox, and a respective container on a respective weigh scale illustrated in some of the lockboxes.
Figure 7:
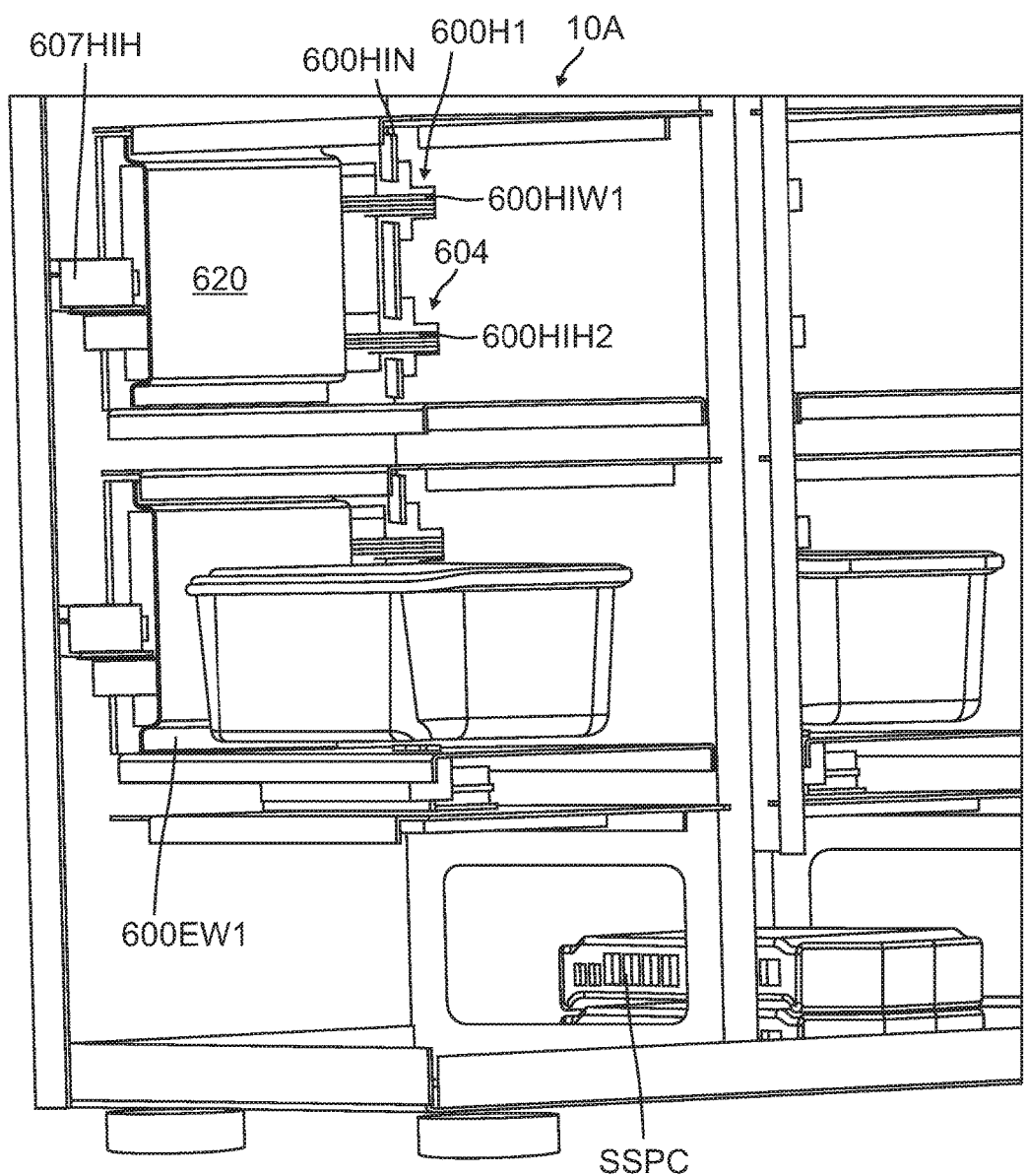
FIG. 7 is a close up view of a portion of the interior of the safe of an embodiment of the present invention illustrating a respective weigh scale in a respective lockbox and a respective container on a respective weigh scale illustrated in some of the lockboxes, and illustrating a computer within the safe which computer is connected to each respective weigh scale to transmit data to the computer on a stand adjacent the safe as illustrated in previous figures.

Two examples of lockbox configurations will now be described. Referring to FIG. 1, within frame 200 are seven rows of lockboxes with four lockboxes in each vertical row, as previously described. Each lockbox, such as 600A1 has a front door 610A and a handle which has a key hole 607A to manually opening the lockbox 600A1, if necessary. As illustrated in FIGS. 6 and 7 (which will be numbered when those figures are discussed), each respective lockbox door such as 6000A1 is affixed to a hinge with rotation members by which the lockbox door is rotatable to cause the door to rotate to an opened condition. Also, as illustrated in FIGS. 6 and 7, each lockbox has an electronic lock.

As illustrated in FIG. 5, in an alternative configuration, the storage safe portion 50 has six rows of lockboxes with three lockboxes in a vertical row. Each respective lockbox, such as 600C1, has a door 600C1-D. As illustrated in FIGS. 6 and 7 (which will be numbered when those figures are discussed), each respective lockbox door such as 600C1-D is affixed to a hinge with rotation members by which the lockbox door is rotatable to cause the door to rotate to an opened condition. Also, as illustrated in FIGS. 6 and 7, each lockbox has an electronic lock.

The operating system for secure safe 10 functions so that once an employee is pre-approved after providing the appropriate verification information, the electronic lock 670E on cover 670 opens, the cover 670 is moved to an opened condition as previously described, the electronic lock on each individual lock opens and each lockbox door rotates to an opened condition. By way of example, the electronic lock is operated through a solenoid. If there is an error in the solenoid not releasing the lockbox then an override manual lock with a key, as previously described, is used.

After a customer determines which variation of herbal product to purchase, at least one of the authorized store personnel then takes the container which contains the corresponding for-sale quantity of herbal product and dispenses the appropriate quantity to a separate scale which can be on top of the counter or adjacent the counter and is a conventional scale which is not illustrated. The quantity of the variation of the for-sale herbal product is placed on the scale and provided to the consumer and then the container is placed back onto the weigh scale and a readout is automatically transmitted to the storage safe computer. This readout advises the computer how much has been dispensed from the container with the weight of the container and for-sale herbal product now decreased by the weight of the variation of for-sale herbal product which was dispensed to the approved customer. Therefore, an accurate record can be kept of the amount of substance dispensed from the specific container so that an inventory control can be fully maintained. The storage safe portion computer is connected by either a wireless or wired connection to elements of the invention which also provide a system of inventory control.

Referring to FIG. 6, there is illustrated a partial rear top open perspective view of a portion of the interior of the storage safe portion 50A taken from FIG. 4 and rotating the image one-hundred eighty (180) degrees in the counter-clockwise direction, illustrating lockbox 600H1 in vertical row VLBH6A for illustrative discussion purposes. Lockbox door 600H1D has an interior portion 600H1HI with opening 600H1HIO to receive electronic lock 607H1H which in FIG. 6 is in the retracted condition to enable the exterior door portion 600H1DE to be in the opened condition. In a locked condition, the electronic lock 607H1H would be inside opening 600H1H1O. In an illustrative embodiment, lockbox door 607H1H is opened through a rotational motion about hinge 600H1N which includes first rotation member 600H1N1 and second rotation member 600H1N2. In the illustrated embodiment, the base 600H1B of lockbox 600H1 is also the top of the lockbox immediately below it. An electronic weigh scale 600EW1 is positioned to rest on base 600H1B and a container 620 drawn in a lower lockbox for visual reasons rests on weigh scale 600EW1. The container 620 retains a for-sale quantity of specific herbal product as previously described. Each lockbox is the same with different specific for-sale herbal products In the illustrative embodiment of FIG. 6, each vertical row of lockboxes has a rear panel, with panels 160D, 160E and 160F in place and the real panels of the first three rows of lockboxes removed to illustrate the interior components. Each lock is configured the same. The weigh scales (such as 607EW1) are in communication with secure safe portion computer SSPC which is a lower portion of secure safe portion 50 and preferably is hardwired to each respective weigh scale in each respective lockbox. An additional option is to have the secure safe portion 50 rest on supporting feet of which 152A, 152C and 152E are illustrated adjacent the rear of secure safe portion 50 FIG. 6, with the understanding that correspond feet are aligned adjacent the front of secure safe portion 50E.

Referring to FIG. 7, there is illustrated a close-up view of some of the components illustrated in FIG. 6 including lockbox 600H1 in vertical row VLBH6A, electronic lock 607H1H which in FIG. 7 is in the retracted condition, hinge 600HIN which includes first rotation member 600HIN1 and second rotation member 600HIN2. In the illustrated embodiment, the base 600H1B of lockbox 600H1 is also the top of the lockbox immediately below it. An electronic weigh scale 600EW1 is positioned to rest on base 600H1B and a container 620 drawn in a lower lockbox for visual reasons rests on weigh scale 600EWI. The container 620 retains a for-sale quantity of specific herbal product as previously described. Each lockbox is the same with different specific for-sale herbal products. In the illustrative embodiment of FIG. 6, each vertical row of lockboxes has a rear panel, with panels 160D, 160E and 160F in place and the real panels of the first three rows of lockboxes removed to illustrate the interior components. Each lock for-sale configured the same. The weigh scales (such as 607EW1) are in communication with secure safe portion computer SSPC which is a lower portion of secure safe portion 50 and preferably is hardwired to each respective weigh scale in each respective lockbox. An additional option is to have the secure safe portion 50 rest on supporting feet of which 152A, 152C and 152E are illustrated adjacent the rear of secure safe portion 50 FIG. 6, with the understanding that corresponding feet are aligned adjacent the front of secure safe portion 50E.

Referring to FIG. 7, there is illustrated a second lockbox above lockbox 600 having a first hinge 602 and a second hinge 604. These hinges are illustrated by example only in this lockbox and it is within the spirit and scope of this invention for all the lockboxes to have hinges that the lockbox doors will rotate on.

Referring again to FIG. 1, adjacent the display case 25 and secure safe portion 50, is a pedestal 100 with a platform 700 supporting a computer and monitor 900. Information from the secure safe portion computer CCPC is transmitted to the computer and monitor 900. Also on the platform 700 is a minimally invasive customer verification device such as a thumb reader 710. The customer will have already been preregistered and will have a prescription from a licensed physician for purchase of the specific herbal product so the customer verification at the point of purchase sale can be simple.

Figure 8:
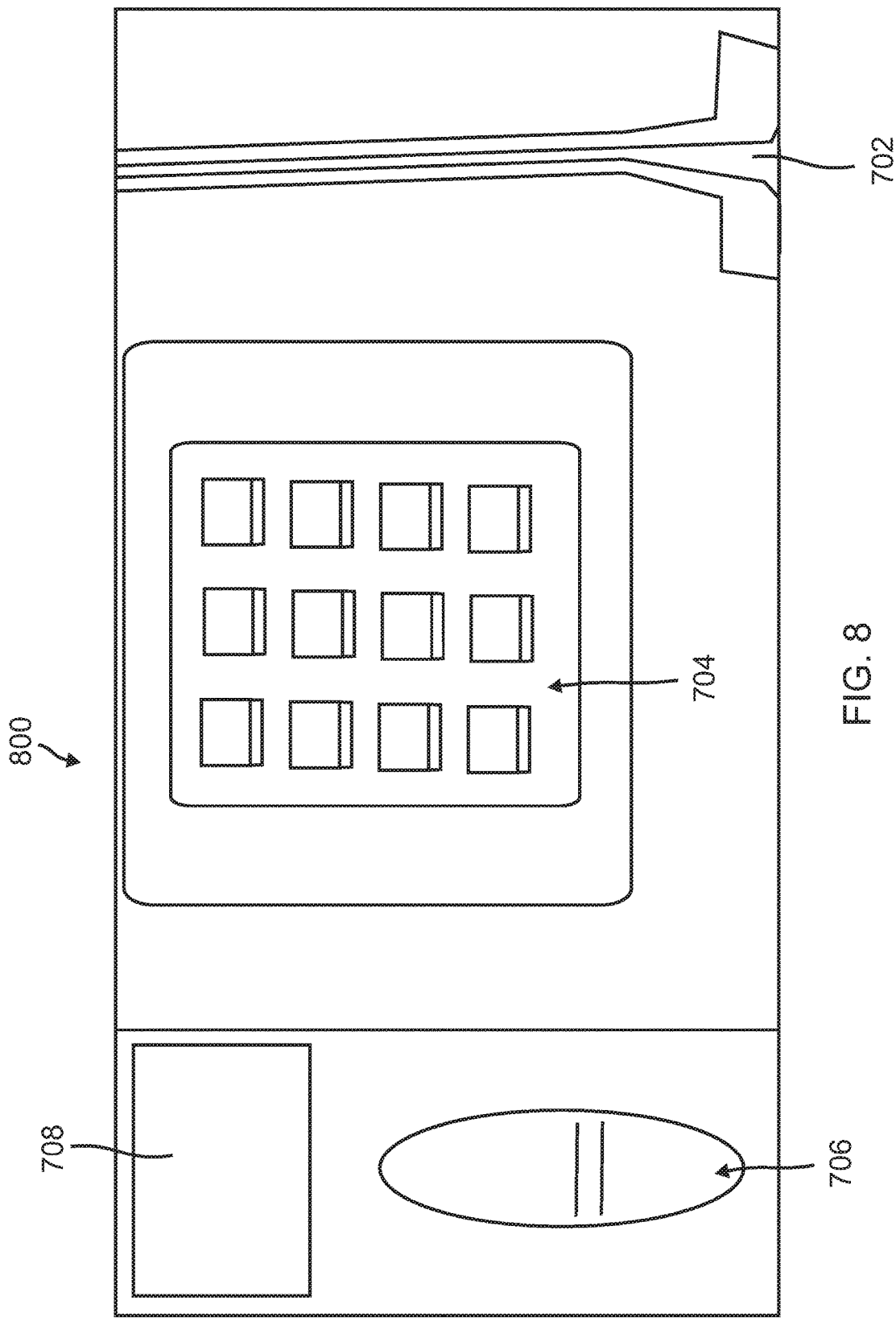
FIG. 8 is an illustration of operating components of the present invention.

For the verification for an employee or other authorized personnel at the dispensary who are given access to the for-sale herbal product and authorized to sell it to the consumer, the verification is more rigorous. Referring to FIG. 8, there is illustrated the employee registration box 800 that allows the operator to be recognized by the computer by means of either a finger print recognition member 706, security code entered on keypad 704, or card swipe using card reader 702. The registration box and the computer will work in conjunction to only allows access to the product through recognition of the operator. The results of this information is displayed on display panel 708. This security measure of the invention offers additional security to prevent theft. Also included in computer and monitor 900, as illustrated in FIG. 1 of this invention, is at least one point-of-sale system with a registration box with a USB cable to a computer. Computer 1000 further contains a connection to fingerprint recognition panel 30 and can accept information from a card swiper adjacent display case 10 to verify the customer and the customer's authorization to obtain the herbal product. The computer will allow access to each of the lockboxes with the lockboxes having a Underwriters Laboratories (UL) safe rating of TL-15.

The above-described verification system is also described as an access to each respective lockbox verification member includes at least one of a finger print recognition member, a security code entered on a keypad and a card swipe reader; and the access to each respective lockbox verification member is positioned at a location selected from the group consisting of affixed onto said display case and affixed onto a structure adjacent to said secure safe portion. The herbal supplement verification member can also be described as an herbal supplement purchaser verification member which is selected from the group consisting of a card swipe reader, a thumb print verification member and the herbal supplement verification member is affixed onto a secure structure adjacent to said secure safe portion.

Further, the computer 1000 can also be described as a central database communication member into which information is input on the quantity and selling price of an herbal supplement sold to a consumer and information from the computer at a location within said body of the secure safe portion is transmitted to a central database communication member and information input into the central database communication member and information transmitted from the computer within the secure safe portion is also transmitted to the central database communication member and the combination information is transmitted to at least one of a group including a police department monitoring dispensing of said herbal supplement and a central database monitoring dispensing where the apparatus is located.

The apparatus described in the present invention is typically located at a legal dispensary authorized to sell herbal supplements to individuals who have a written approval from a licensed physician or other recognized medical authority to receive and use the herbal supplement.

The present invention includes a user friendly apparatus to retain herbal products at a dispensary where such herbal products are sold to a consumer who has properly complied with the requirements that he was authorized to have for the amount of herbal product to be dispensed to him during a period of time. Therefore, the apparatus comprises a user friendly system as set forth above to provide security for the herbal product at the point of sale location and also provides security for both determining the personnel who gained access to the safe and were able to open the safe and dispense quantities of the herbal product as well as monitor the amount of inventory remaining of each variation of the herbal product in each container within bottom storage 50.

The present invention as set forth above provides an apparatus at a point-of-sale location which facilitates a safe to store all of the herbal products in canisters where each variation of the herbal product is clearly set forth and with a weighing apparatus so that after an amount of herbal product is dispensed pursuant to legal restrictions, the amount remaining of the specific herbal product in the specific location is obtained so that a proper inventory control on a daily basis can be maintained.

Further, the present invention is a method or system of inventory control where the amount of a certain medicinal herb sold to a customer is stored to confirm that the customer was authorized to make the legal purchase and to confirm the person making the sale was authorized to do so. The system monitors all inventory to be certain the sales person is correctly accounting for inventory sold, the consumer has obtained an appropriate physician's authorization to purchase the amount of herbal products required and to confirm the remaining inventory of the specific category of herbal product remaining after an order has been fulfilled.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to maintain and sell an inventory of herbal products, the apparatus comprising:
   a. a display safe including a display case portion and a storage safe portion;
   b. said display case portion having a transparent top, a transparent front wall, a transparent first sidewall, a transparent second sidewall, a transparent rear wall, and a bottom wall all enclosing an interior compartment, at least one of said transparent top, transparent front wall, transparent first sidewall, transparent second sidewall, and transparent rear wall including an opening member by which it is moved to an opened condition to gain access to said interior compartment and moved back to its non-opened condition and having a locking member;
   c. a multiplicity of at least partially transparent display containers removably retained within said interior compartment of said display case, a respective one of each of said multiplicity of at least partially transparent display containers having at least an exterior transparent wall and a bottom wall enclosing an interior compartment removably retaining a specific specimen of an herbal supplement, a member having information on said specific herbal supplement;
   d. a secure safe portion positioned within a frame having at least a front wall, a first sidewall, a second sidewall, a body and a rear wall with a rear wall locking member, a multiplicity of lockboxes within said body, a respective one of each of said multiplicity of lockboxes having an interior compartment surrounded by exterior walls including a bottom wall, an electronic weigh scale positioned within the interior compartment and a removable container retaining a for-sale quantity of an herbal supplement corresponding to a respective specific specimen herbal supplement in a respective display container in said interior compartment of said display case, each of said multiplicity of lockboxes having an access door with an access door electronic lock, a computer at a location within said body of said secure safe portion and in communication with each respective weigh scale in each respective lockbox receiving information on the weight of each respective for-sale herbal supplement in each respective removable container in each respective lockbox; and
   e. an access to each respective lockbox verification member, a for-sale quantity of herbal supplement measurement member, an herbal supplement purchaser verification member and a central database communication member.

2. The apparatus in accordance with claim 1, further comprising: said display case portion is affixed above said secure safe portion.

3. The apparatus in accordance with claim 2, further comprising:
   a. a selected first number of said multiplicity of at least partially transparent display containers aligned in a transverse row within said interior compartment of said display case;
   b. a selected same first number of lockboxes aligned in a vertical row within said secure safe portion with each display container in said transverse row assigned to a specific lockbox in said aligned vertical row; and
   c. each of said selected first number of said multiplicity of at least partially transparent display containers retaining a specific one of said specific specimen of an herbal supplement and each of said selected same first number of lockboxes having a removable container retaining a specific for-sale quantity of a for-sale herbal supplement being the same specific one of said specific specimen of an herbal supplement in a corresponding display container.

4. The apparatus in accordance with claim 3, further comprising:
   a. said selected first number of said multiplicity of at least partially transparent display containers aligned in a transverse row within said interior compartment of said display case is four;
   b. said selected same first number of lockboxes aligned in a vertical row within said secure safe portion is four;
   c. seven transverse rows of aligned partially transparent display containers; and
   d. seven aligned vertical rows of lockboxes.

5. The apparatus in accordance with claim 3, further comprising:
   a. said selected first number of said multiplicity of at least partially transparent display containers aligned in a transverse row within said interior compartment of said display case is three;
   b. said selected same first number of lockboxes aligned in a vertical row within said secure safe portion is three;
   c. six transverse rows of aligned partially transparent display containers; and
   d. six aligned vertical rows of lockboxes.

6. The apparatus in accordance with claim 1, further comprising: said member having specific information on said specific herbal supplement is visibly positioned within said interior compartment of said display case adjacent a display container retaining the same specific herbal supplement.

7. The apparatus in accordance with claim 1, further comprising: said member having specific information on said specific herbal supplement is visibly affixed to an exterior wall of a container retaining the same specific herbal supplement.

8. The apparatus in accordance with claim 1, further comprising: said computer at a location within said body of said secure safe portion is hard wired to each respective weigh scale in each respective lockbox.

9. The apparatus in accordance with claim 1, further comprising:
   a. said access to each respective lockbox verification member includes at least one of a finger print recognition member, a security code entered on a keypad and a card swipe reader; and
   b. said access to each respective lockbox verification member is positioned at a location selected from the group consisting of affixed onto said display case and affixed onto a structure adjacent to said secure safe portion.

10. The apparatus in accordance with claim 1, further comprising:

a. said herbal supplement purchaser verification member is selected from the group consisting of a card swipe reader and a thumb print verification member; and
b. said herbal supplement purchaser verification member is affixed onto a structure adjacent to said secure safe portion.

11. The apparatus in accordance with claim 1, further comprising:
a. a central database communication member is a computer into which information is input on the quantity and selling price of an herbal supplement sold to a consumer;
b. information from said computer at a location within said body of said secure safe portion is transmitted to said central database communication member; and
c. information input in step "a" and received in step "b" is transmitted to at least one of a group including police department monitoring dispensing of the herbal supplement, and a central database monitoring dispensaries where the apparatus is located.

12. The apparatus in accordance with claim 11, further comprising: said central database communication member is positioned on a structure adjacent the secure safe portion.

13. The apparatus in accordance with claim 1, further comprising:
a. a weigh scale exterior to said secure safe portion to measure a weight of a for-sale herbal supplement sold to a consumer; and
b. the location of the weigh scale adjacent to said secure safe portion.

14. The apparatus in accordance with claim 1, further comprising: said rear wall locking member of the secure safe portion is a solid wall enclosing all lockboxes when the rear wall locking member is in a closed condition, and retained in a gap between the display case and the secure safe portion when the rear wall locking member is in an opened condition.

* * * * *